(12) United States Patent
Uhlmer (10) Patent No.: US 11,359,474 B1
(45) Date of Patent: Jun. 14, 2022

(54) SYSTEMS AND METHODS FOR DISTRIBUTING FLUIDS AT A WELLSITE

(71) Applicant: ProFrac Services, LLC, Willow Park, TX (US)

(72) Inventor: Brian Uhlmer, Fort Worth, TX (US)

(73) Assignee: PROFRAC SERVICES, LLC, Willow Park, TX (US)

( * ) Notice: Subject to any disclaimer, the term of this patent is extended or adjusted under 35 U.S.C. 154(b) by 0 days.

(21) Appl. No.: 17/378,181

(22) Filed: Jul. 16, 2021

(51) Int. Cl.
  *E21B 43/26* (2006.01)
  *F16L 41/03* (2006.01)

(52) U.S. Cl.
  CPC .......... *E21B 43/2607* (2020.05); *F16L 41/03* (2013.01)

(58) Field of Classification Search
  CPC ....... E21B 43/26; E21B 43/2607; F16L 41/03
  See application file for complete search history.

(56) References Cited

U.S. PATENT DOCUMENTS

| | | |
|---|---|---|
| 10,570,692 B1 | 2/2020 | Sizemore |
| 10,858,902 B2 | 6/2020 | Sizemore |
| 10,900,475 B2 * | 1/2021 | Weightman ............ E21B 43/25 |
| 2017/0370199 A1 * | 12/2017 | Witkowski ........... E21B 33/068 |
| 2018/0283151 A1 | 10/2018 | Cook et al. |
| 2020/0325761 A1 * | 10/2020 | Williams ............... F04B 17/06 |
| 2020/0340322 A1 | 12/2020 | Sizemore |
| 2020/0393088 A1 | 12/2020 | Sizemore |
| 2021/0156240 A1 | 5/2021 | Cicci et al. |

* cited by examiner

*Primary Examiner* — Matthew R Buck
(74) *Attorney, Agent, or Firm* — MH2 Technology Law Group LLP (57) ABSTRACT

A fluid distribution unit includes a first upstream frac pipe configured to receive a frac fluid and to distribute the frac fluid to a plurality of pump units at a first pressure. The fluid distribution unit also includes a downstream frac pipe configured to receive the frac fluid from the pump units at a second pressure that is greater than the first pressure. The frac fluid at the second pressure is directed into a wellbore. The fluid distribution unit also includes a natural gas pipe configured to receive natural gas from a gas source and to distribute the natural gas to the pump units. The fluid distribution unit also includes a diesel pipe configured to receive diesel from a diesel source and to distribute the diesel to the pump units.

18 Claims, 11 Drawing Sheets

SYSTEMS AND METHODS FOR DISTRIBUTING FLUIDS AT A WELLSITE

BACKGROUND

A wellsite may include wellbore that has been drilled into a subterranean formation. Once the wellbore has been drilled, hydraulic fracturing may take place therein. Hydraulic fracturing is a well stimulation technique involving the fracturing of bedrock formations by a pressurized liquid. The process involves the high-pressure injection of fracking fluid (e.g., water, containing sand or other proppants suspended with the aid of thickening agents) into the wellbore to create cracks in the deep-rock formations through which natural gas, petroleum, and brine may flow more freely. When the hydraulic pressure is removed from the well, small grains of hydraulic fracturing proppants (e.g., sand or aluminum oxide) hold the fractures open.

The wellsite may include one or more engines. Natural gas is pumped to the engines using a plurality of trailers designed only to distribute natural gas. These trailers take up space at the wellsite. In addition, these trailers require large amounts of gas tubing to be used to reach the engines at the wellsite. This leads to longer rig-up times and potential safety risks. Diesel auto-fuelers at the wellsite have similar issues, as each pump requires a long tube from the diesel trailer. Therefore, what is needed is an improved system and method for distributing fluids at a wellsite.

SUMMARY

A fluid distribution unit is disclosed. The fluid distribution unit includes a first upstream frac pipe configured to receive a frac fluid and to distribute the frac fluid to a plurality of pump units at a first pressure. The fluid distribution unit also includes a downstream frac pipe configured to receive the frac fluid from the pump units at a second pressure that is greater than the first pressure. The frac fluid at the second pressure is directed into a wellbore. The fluid distribution unit also includes a natural gas pipe configured to receive natural gas from a gas source and to distribute the natural gas to the pump units. The fluid distribution unit also includes a diesel pipe configured to receive diesel from a diesel source and to distribute the diesel to the pump units. The natural gas pipe, the diesel pipe, or both are positioned at least partially above the first upstream frac pipe, the downstream frac pipe, or both.

In another embodiment, the fluid distribution unit includes a base. The fluid distribution system also includes a first upstream frac pipe positioned above the base. The fluid distribution system also includes a second upstream frac pipe positioned above the base. The first and second upstream frac pipes are spaced laterally-apart from one another. The first and second upstream frac pipes each include an upstream frac pipe inlet configured to be connected to a frac fluid source and to receive a frac fluid at a first pressure from the frac fluid source. The first and second upstream frac pipes also each include a plurality of upstream frac pipe outlets configured to be connected to a plurality of frac pumps. The frac fluid at the first pressure flows out of the upstream frac pipe outlets to the frac pumps. The fluid distribution system also includes a downstream frac pipe positioned above the first and second upstream frac pipes. The downstream frac pipe includes a plurality of downstream frac pipe inlets configured to be connected to the frac pumps and to receive the frac fluid at a second pressure from the frac pump. The second pressure is greater than the first pressure. The downstream frac pipe also includes a downstream frac pipe outlet configured to be connected to a wellhead. The frac fluid at the second pressure flows out of the downstream frac pipe outlet to the wellhead. The fluid distribution system also includes a natural gas pipe positioned above the downstream frac pipe. The natural gas pipe includes a natural gas inlet configured to be connected to a natural gas source and to receive natural gas from the natural gas source. The natural gas pipe also includes a plurality of natural gas outlets configured to be connected to a plurality of engines. The natural gas flows out of the natural gas outlets to the engines. The fluid distribution system also includes a diesel pipe positioned above the downstream frac pipe. The diesel pipe includes a diesel inlet configured to be connected to a diesel source and to receive diesel from the diesel source. The diesel pipe also includes a plurality of diesel outlets configured to be connected to the engines. The diesel flows out of the diesel outlets to the engines. The engines are dual-fuel engines. The engines are configured to drive the frac pumps. The fluid distribution system also includes a diesel exhaust fluid (DEF) pipe positioned above the downstream frac pipe. The DEF pipe includes a DEF inlet configured to be connected to a DEF source and to receive DEF from the DEF source. The DEF pipe also includes a plurality of DEF outlets configured to be connected to the engines. The DEF flows out of the DEF outlets to the engines.

A method for distributing fluid at a wellsite is also disclosed. The method includes distributing natural gas from a natural gas source, through a natural gas pipe, to a plurality of pump units. The method also includes distributing diesel from a diesel source, through a diesel pipe, to the pump units. The method also includes distributing frac fluid from a frac fluid source, through first and second upstream frac pipes, to the pump units. The method also includes distributing the frac fluid from the frac pumps, through a downstream frac pipe, and into a wellbore. The natural gas pipe, the diesel pipe, or both are positioned at least partially laterally-between the first and second upstream frac pipes.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

Figure 1:
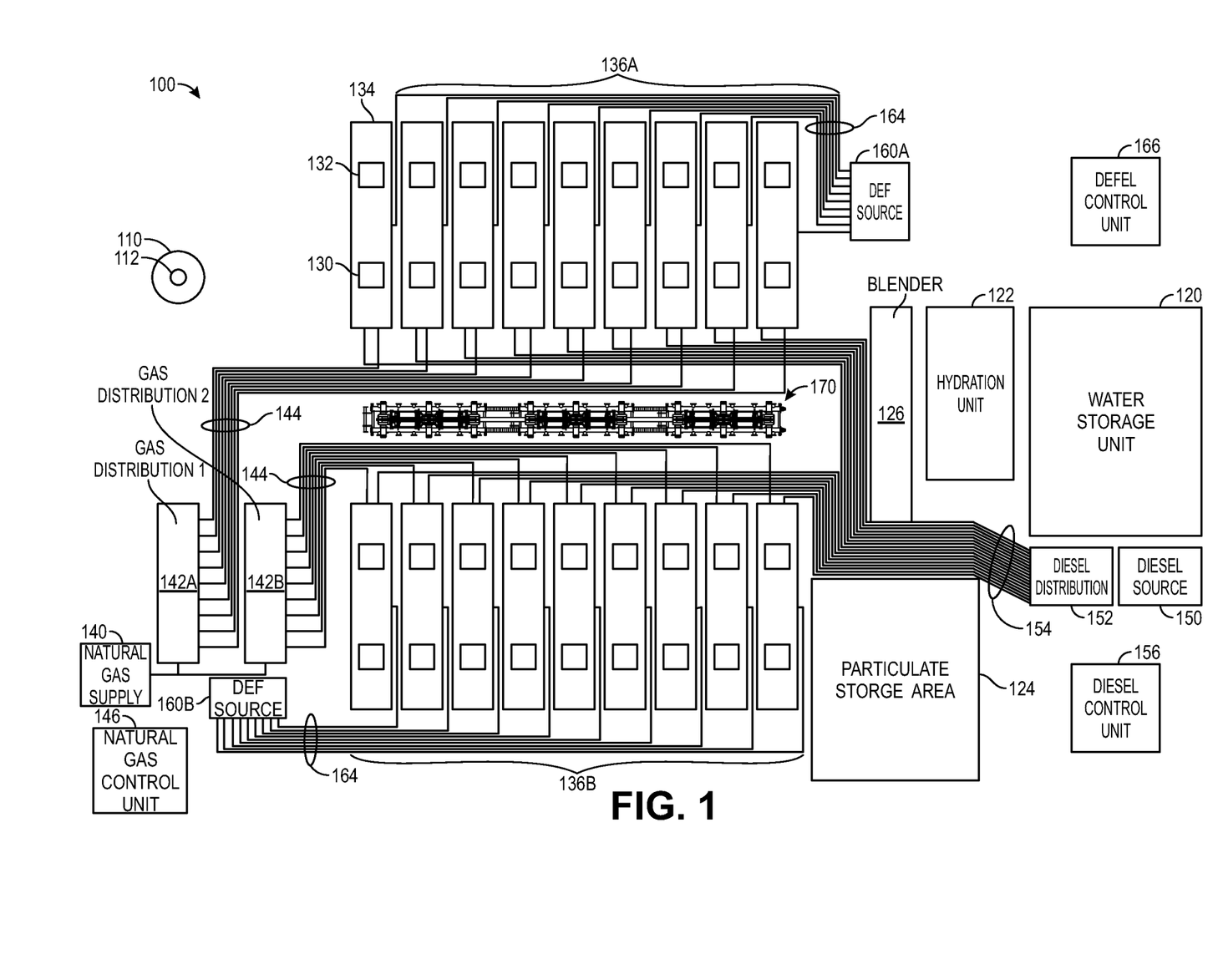
FIG. 1 illustrates a schematic view of a wellsite, according to an embodiment.

FIG. 1 illustrates a schematic view of a wellsite 100, according to an embodiment. The wellsite 100 may include one or more wellbores (one is shown: 110). A wellhead 112 may be positioned above and/or at least partially within the wellbore 110. The wellsite 100 may also include equipment configured to hydraulically fracture the wellbore 110, as described below.

The wellsite 100 may also include a water storage unit 120 that is configured to store water. The wellsite 100 may also include a hydration unit 122 configured to combine the water with one or more chemicals to produce water-based gels and/or foams. The wellsite 100 may also include a particulate storage area 124 that is configured to store fracturing proppants such as sand, ceramic particles, aluminum oxide particles, or a combination thereof. The wellsite 100 may also include a blender 126 that is configured to combine and mix (i.e., blend) the water, the gel, the foam, the fracturing proppants, or a combination thereof to produce a fracking fluid (also referred to as frac fluid).

The wellsite 100 may also include one or more frac pumps (18 are shown: 130) configured to pump the frac fluid through the wellhead 112 and into the wellbore 110. The wellsite 100 may also include one or more engines (18 are shown: 132) configured to drive the frac pumps 130. As shown, each frac pump 130 includes a corresponding engine 132, which together form a pump unit 134. In this particular example, there are 18 pump units 134, which are arranged in two groups, with nine pump units 134 arranged side-by-side in the first group 136A, and nine pump units 134 arranged side-by-side in the second group 136B.

In one embodiment, the engines 132 may be or include dual-fuel engines that are configured to use two different fuel sources. In an example, the fuel sources may be or include natural gas and diesel. Thus, the wellsite 100 may also include one or more natural gas sources (one is shown: 140). In the embodiment shown, the natural gas source 140 may be connected to one or more natural gas distribution manifolds (two are shown: 142A, 142B). The first natural gas distribution manifold 142A may distribute the natural gas from the source 140 to the engines 132 in the first pump group 136A via natural gas hoses 144, and the second natural gas distribution manifold 142B may distribute the natural gas from the source 140 to the engines 132 in the second pump group 136B via the natural gas hoses 144. Thus, in this particular example, 18 natural gas hoses 144 may be used. Due to the side-by-side arrangements of the pump units 134, the widths of the pump units 134, and the aggregate widths of the groups 136A, 136B, the natural gas hoses 144 may have varying lengths, with the shortest being about 10 m, and the longest being about 50 m. An aggregate length of the natural gas hoses 144 may be from about 660 m to about 900 m. The natural gas distribution may be monitored and controlled via a first (e.g., natural gas) control unit 146 (e.g., by a first person).

The wellsite 100 may also include one or more diesel sources (one is shown: 150). In the embodiment shown, the diesel source 150 may be connected to one or more diesel distribution manifolds (one is shown: 152). The diesel distribution manifold 152 may distribute the diesel from the source 150 to the engines 132 via diesel hoses 154. Thus, in this particular example, 18 diesel hoses 154 may be used. Due to the side-by-side arrangements of the pump units 134, the widths of the pump units 134, and the aggregate widths of the groups 136A, 136B, the diesel hoses 154 may have varying lengths, with the shortest being about 20 m, and the longest being about 50 m. An aggregate length of the diesel hoses 154 may be from about 660 m to about 900 m. The diesel distribution may be monitored and controlled via a second (e.g., diesel) control unit 156 (e.g., by a second person).

The wellsite 100 may also include one or more diesel exhaust fluid (DEF) sources (two is shown: 160A, 160B). The DEF may be configured to reduce the amount of air pollution created by the engines 132. In the embodiment shown, the DEF source 160A may distribute the DEF to the engines 132 in the first group 136A via DEF hoses 164, and the DEF source 160B may distribute the DEF to the engines 132 in the second group 136B via the DEF hoses 164. Thus, in this particular example, 18 DEF hoses 164 may be used. Due to the side-by-side arrangements of the pump units 134, the widths of the pump units 134, and the aggregate widths of the groups 136A, 136B, the DEF hoses 164 may have varying lengths, with the shortest being about 12 m, and the longest being about 50 m. An aggregate length of the diesel DEF 164 may be from about 660 m to about 900 m. The DEF distribution may be monitored and controlled via a third (e.g., DEF) control unit 166 (e.g., by a third person).

The wellsite 100 may also include a monoline 170. The frac fluid may flow from the blender 126, into the monoline 170, and then into the frac pumps 130 where the pressure of the frac fluid may be increased. The frac fluid may then flow from the frac pumps 130 into the monoline 170, and into the wellbore 110 via the wellhead 112.

Figure 2:
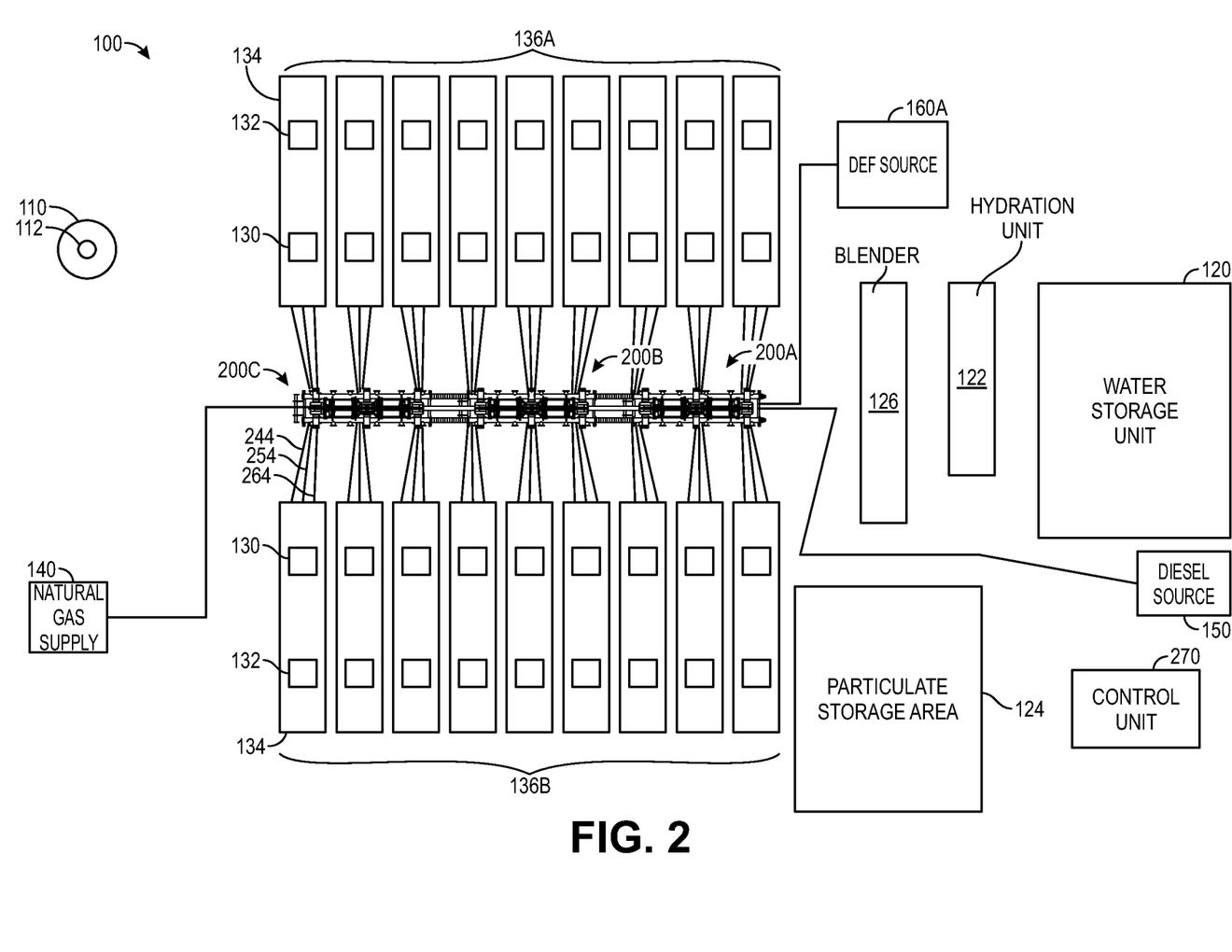
FIG. 2 illustrates a schematic view of the wellsite with one or more fluid distribution units, according to an embodiment.

FIG. 2 illustrates another schematic view of the wellsite 100, according to an embodiment. The wellsite 100 in FIG. 2 is similar to the wellsite 100 in FIG. 1, and similar reference numbers are used where applicable. However, in FIG. 2, some of the equipment from FIG. 1 has been removed and replaced with one or more fluid distribution units (three are shown: 200A-200C). The removed equipment may include the gas distribution manifolds 142A, 142B, the natural gas hoses 144, the natural gas control unit 146, the diesel distribution manifold 152, the diesel hoses 154, the diesel control unit 156, the DEF source 160B, the DEF hoses 164, the DEF control unit 166, the monoline 170, or a combination thereof.

The fluid distribution units 200A-200C may be positioned at least partially between the first group 136A and the second group 136B. As described below, the fluid distribution units 200A-200C may be located in a position that minimizes the (e.g., aggregate) distance between the fluid distribution units 200A-200C and the engines 134.

The natural gas source 140 may be connected (e.g., directly) to the fluid distribution units 200A-200C. One or more natural gas hoses (18 are shown: 244) may distribute the natural gas from the fluid distribution units 200A-200C to the engines 132. The length of each natural gas hose 244 may be from about 3 m to about 8 m. An aggregate length of the natural gas hoses 244 may be from about 54 m to about 144 m.

The diesel source 150 may also be connected (e.g., directly) to the fluid distribution units 200A-200C. One or more diesel hoses (18 are shown: 254) may distribute the diesel from the fluid distribution units 200A-200C to the engines 132. The length of each diesel hose 254 may be from about 3 m to about 8 m. An aggregate length of the diesel hoses 254 may be from about 54 m to about 144 m.

The DEF source 160 may be connected (e.g., directly) to the fluid distribution systems 200A-200C. One or more DEF hoses (18 are shown: 264) may distribute the natural gas from the fluid distribution units 200A-200C to the engines 132. The length of each DEF hose 264 may be from about 3 m to about 8 m. An aggregate length of the DEF hoses 264 may be from about 54 m to about 144 m.

Thus, as may be seen, the embodiment of FIG. 2 may significantly reduce the amount/length of hoses that are used at the wellsite 100. This may reduce the weight of the hoses, which may facilitate the shipping and/or installation of the hoses. Moreover, having less hose at the wellsite 100 may provide safety benefits, such as reducing the likelihood of a user tripping over the hoses, and reducing the amount of equipment (e.g., hoses) that may potentially fail (e.g., develop a leak). Furthermore, having less hose at the wellsite 100 may reduce the energy needed to pump the fluids (natural gas, diesel, DEF) to the engines 134.

In addition, running the hoses 244, 254, 264 through the fluid distribution units 200A-200C may allow a single control unit 270 (e.g., operated by a single person) to monitor and control the distribution of the natural gas, the diesel, the DEF, or a combination thereof.

Figure 3:
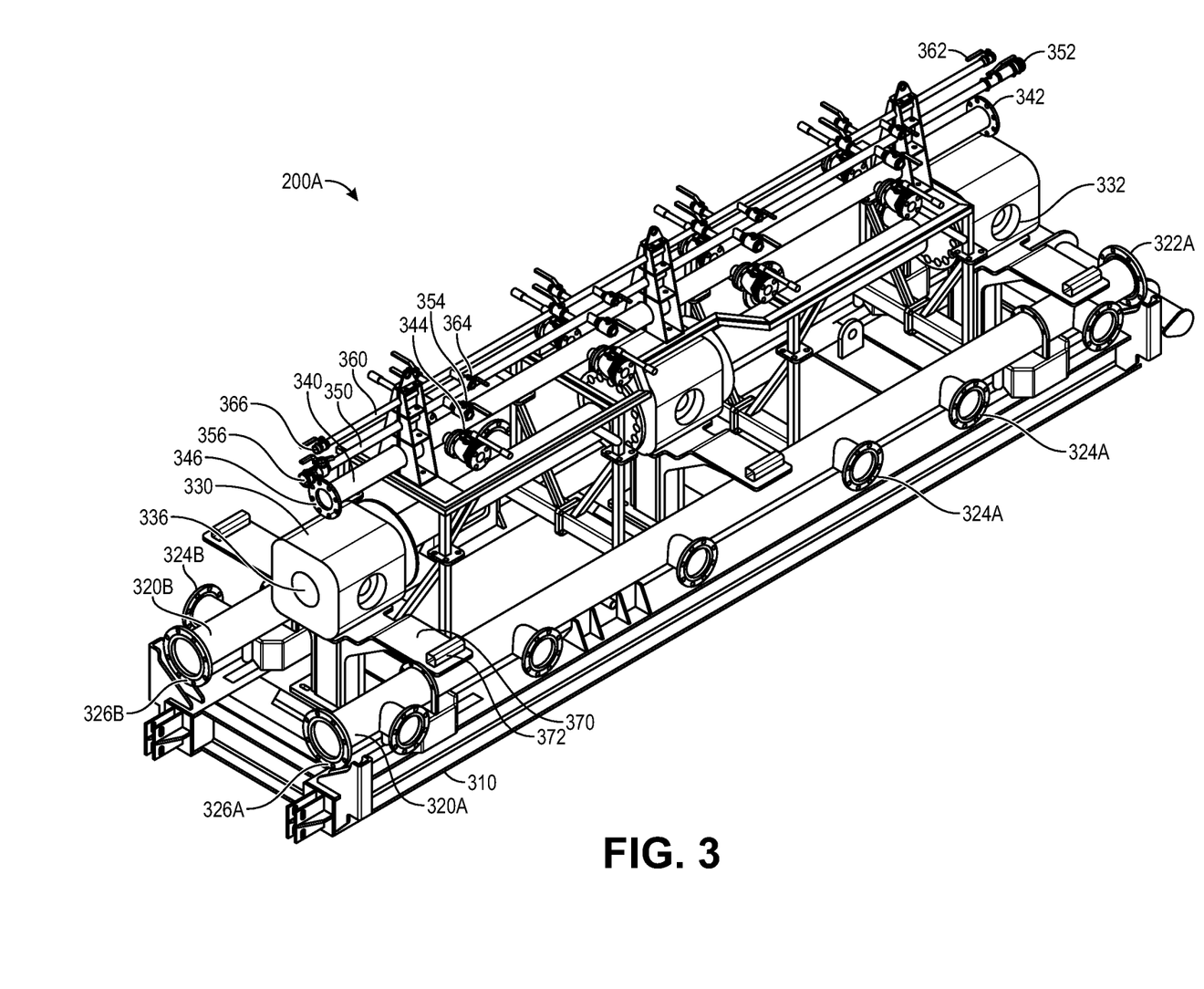
FIG. 3 illustrates a perspective view of one of the fluid distribution units, according to an embodiment.

FIG. 3 illustrates a perspective view of one of the fluid distribution units 200A, according to an embodiment. Although the following description is with reference to the fluid distribution unit 200A, it will be appreciated that the other fluid distribution units 200B, 200C, etc., may be the same as the fluid distribution unit 200A, or different from the fluid distribution unit 200A.

The fluid distribution unit 200A may include a base 310. The fluid distribution unit 200A may also include one or more first (e.g., upstream) frac pipes (two are shown: 320A, 320B) that are positioned at least partially on and/or above the base 310. The upstream frac pipes 320A, 320B may have an inner diameter from about 20.32 cm to about 25.4 cm. The upstream frac pipes 320A, 320B may include inlets 322A, 322B that are configured to be connected to the blender 126. The frac fluid may flow from the blender 126 into the upstream frac pipes 320A, 320B via the inlets 322A, 322B. The frac fluid may be at a first (e.g., low) pressure in the upstream frac pipes 320A, 320B. The upstream frac pipes 320A, 320B may also include one or more first outlets (six are shown: 324A, 324B) that are configured to be connected to suction sides of the frac pumps 130. A portion of the frac fluid may flow out of the upstream frac pipes 320A, 320B via the first outlets 324A, 324B and into the frac pumps 130, where the pressure of the frac fluid may be increased. The upstream frac pipes 320A, 320B may also include a second outlet (one is shown: 326A, 326B) that is configured to be connected to inlets of upstream frac pipes of a downstream fluid distribution unit (e.g., fluid distribution unit 200B). A portion of the frac fluid may flow out of the upstream frac pipes 320A, 320B of the first fluid distribution unit 200A via the outlets 326A, 326B and into the upstream frac pipes of the second fluid distribution unit 200B.

The fluid distribution unit 200A may also include one or more second (e.g., downstream) frac pipes (one is shown: 330). The downstream frac pipe 330 may be positioned above and/or laterally-between the upstream frac pipes 320A, 320B. The downstream frac pipe 330 may have an inner diameter from about 17.78 cm to about 20.32 cm. The downstream frac pipe 330 may include one or more inlets (three are shown: 332) that are configured to be connected to discharge sides of the frac pumps 130. The frac fluid may flow out of the frac pumps 130 and into the downstream frac pipe 330 via the inlets 332. The frac fluid may be at a second (e.g., high) pressure in the downstream frac pipe 330. The downstream frac pipe 330 may also include an outlet (one is shown: 336) that is configured to be connected to a downstream frac pipe of a downstream fluid distribution unit (e.g., fluid distribution unit 200B). The frac fluid may flow out of the downstream frack pipe 330 of the first fluid distribution unit 200A via the outlet 336 and into the downstream frac pipes of the second fluid distribution unit 200B. In another embodiment, the outlet 336 may be configured to be connected to the wellhead 112. In this embodiment, the frac fluid may flow out of the downstream frack pipe 330 of the first fluid distribution unit 200A via the outlet 336 and into the wellbore 110 via the wellhead 112.

The fluid distribution unit 200A may also include one or more natural gas pipes (one is shown: 340). The natural gas pipe 340 may be positioned above the upstream frac pipes 320A, 320B and/or the downstream frac pipe 330. The natural gas pipe 340 may be positioned laterally-between the upstream frac pipes 320A, 320B. The natural gas pipe 340 may have an inner diameter from about 10.16 cm to about 15.2411 cm. The natural gas pipe 340 may include an inlet 342 that is configured to be connected to the natural gas source 140. The natural gas may flow from the natural gas source 140 into the natural gas pipe 340 via the inlet 342. The natural gas pipe 340 may also include one or more first outlets (eight are shown: 344) that are configured to be connected to the engines 132. The outlets 344 may be or include quick-connect outlets that are configured to connect to the natural gas hoses 244. The natural gas may flow out of the natural gas pipe 340 via the first outlets 344 and into the engines 132. The natural gas pipe 340 may also include a second outlet (one is shown: 346) that is configured to be connected to an inlet of a natural gas pipe of a downstream fluid distribution unit (e.g., fluid distribution unit 200B). A portion of the natural gas may flow out of the natural gas pipe 340 of the first fluid distribution unit 200A via the second outlet 346 and into the natural gas pipe of the second fluid distribution unit 200B.

The fluid distribution unit 200A may also include one or more diesel pipes (one is shown: 350). The diesel pipe 350 may be positioned above the upstream frac pipes 320A, 320B, the downstream frac pipe 330, the natural gas pipe 340, or a combination thereof. The diesel pipe 350 may be positioned laterally-between the upstream frac pipes 320A, 320B. The diesel pipe 350 may have an inner diameter from about 4 cm to about 6 cm or about 4.5 cm to about 5.5 cm. The diesel pipe 350 may include an inlet 352 that is configured to be connected to the diesel source 150. The diesel may flow from the diesel source 150 into the diesel pipe 350 via the inlet 352. The diesel pipe 350 may also include one or more first outlets (eight are shown: 354) that are configured to be connected to the engines 132. The outlets 354 may be or include quick-connect outlets that are configured to connect to the diesel hoses 254. The diesel may flow out of the diesel pipe 350 via the first outlets 354 and into the engines 132. The diesel pipe 350 may also include a second outlet (one is shown: 356) that is configured to be connected to an inlet of a diesel pipe of a downstream fluid distribution unit (e.g., fluid distribution unit 200B). A portion of the diesel may flow out of the diesel pipe 350 of the first fluid distribution unit 200A via the second outlet 356 and into the diesel pipe of the second fluid distribution unit 200B.

The fluid distribution unit 200A may also include one or more DEF pipes (one is shown: 360). The DEF pipe 360 may be positioned above the upstream frac pipes 320A, 320B, the downstream frac pipe 330, the natural gas pipe 340, the diesel pipe 350, or a combination thereof. The DEF pipe 360 may be positioned laterally-between the upstream frac pipes 320A, 320B. The DEF pipe 360 may have an inner diameter from about 2 cm to about 4 cm or about 3 cm to about 3.9 cm. The DEF pipe 360 may include an inlet 362 that is configured to be connected to the DEF source 160. The DEF may flow from the DEF source 160 into the DEF pipe 360 via the inlet 362. The DEF pipe 360 may also include one or more first outlets (eight are shown: 364) that are configured to be connected to the engines 132. The outlets 364 may be or include quick-connect outlets that are configured to connect to the DEF hoses 264. The DEF may flow out of the DEF pipe 360 via the first outlets 364 and into the engines 132. The DEF pipe 360 may also include a second outlet (one is shown: 366) that is configured to be connected to an inlet of a DEF pipe of a downstream fluid distribution unit (e.g., fluid distribution unit 200B). A portion of the DEF may flow out of the DEF pipe 360 of the first fluid distribution unit 200A via the second outlet 366 and into the DEF pipe of the second fluid distribution unit 200B.

The fluid distribution unit 200A may include one or more arms (three are shown: 370). The arms 370 may be positioned vertically-between the upstream frac pipes 320A, 320B and the downstream frac pipe 330. As a result, the arms 370 may at least partially support the weight of the downstream frac pipe 330. The arms 370 may extend laterally-outward beyond the upstream frac pipes 320A, 320B. The outer ends of the arms 370 may include connectors 372 that are configured to connect to a lifting device, and the lifting device may be configured to lift and move the fluid distribution unit 200A.

Figure 4:
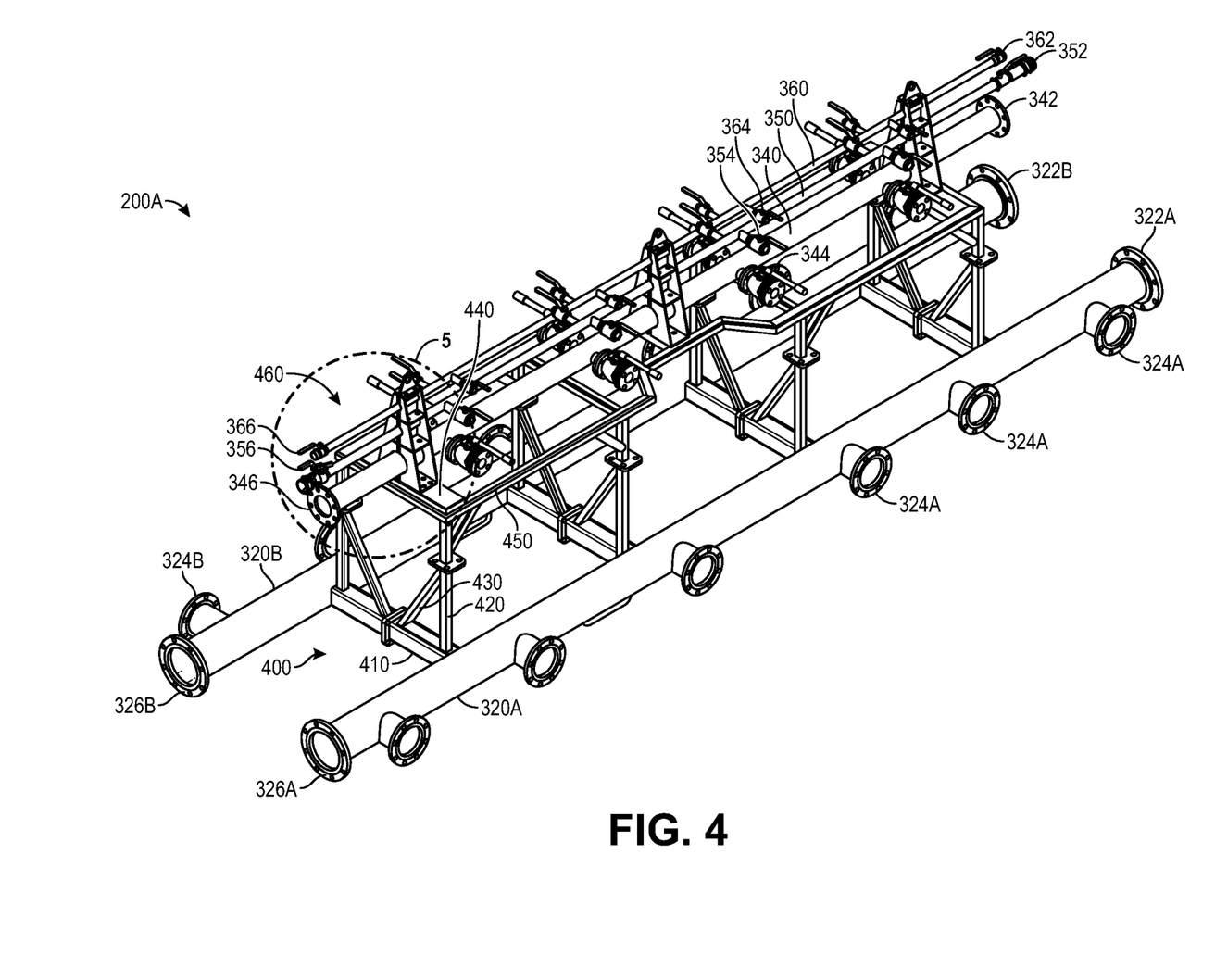
FIG. 4 illustrates a perspective view of the fluid distribution unit (from FIG. 3) with a frac pipe removed for clarity, according to an embodiment.

FIG. 4 illustrates a perspective view of the fluid distribution unit 200A with the downstream frac pipe 330 removed for clarity, according to an embodiment. The fluid distribution unit 200A may also include a support structure 400 configured to support the natural gas pipe 340, the diesel pipe 350, the DEF pipe 360, or a combination thereof. The support structure 400 may include one or more lower crossbeams (four are shown: 410). The lower crossbeams 410 may extend laterally-between and/or be connected to the upstream frac pipes 320A, 320B. The lower crossbeams 410 may be axially-offset from one another along the length(s) of the upstream frac pipes 320A, 320B.

The support structure 400 may also include one or more vertical beams (eight are shown: 420). The vertical beams 420 may be connected to the lower crossbeams 410 and extend vertically upward therefrom. The upper ends of the vertical beams 420 may be positioned above the downstream frac pipe 330 (see FIG. 3). The support structure 400 may also include one or more diagonal beams (eight are shown: 430). The diagonal beams 430 may be positioned at least partially laterally-between the upstream frac pipes 420A, 420B and/or the vertical beams 420. The vertical beams 420 and/or the diagonal beams 430 may be configured to support the weight of the natural gas pipe 440, the diesel pipe 450, the DEF pipe 460, or a combination thereof.

The support structure 400 may also include one or more upper crossbeams (five are shown: 440). The upper crossbeams 440 may be positioned above the lower crossbeams 410. The upper crossbeams 440 may extend laterally-between and/or be connected to the vertical beams 420. The upper crossbeams 440 may be axially-offset from one another.

The support structure 400 may also include one or more axial beams (two are shown: 450). The axial beams 450 may be substantially parallel to the upstream frac pipes 320A, 320B, the natural gas pipe 340, the diesel pipe 350, the DEF pipe 360, or a combination thereof. The axial beams 450 may be substantially perpendicular to the vertical beams 420, the upper crossbeams 440, or both.

The support structure 400 may also include one or more modular pipe mounts (three are shown: 460). The modular pipe mounts 460 may be coupled to the upper crossbeams 440 and extend upward therefrom. The modular pipe mounts 460 may include one or more openings through which the natural gas pipe 340, the diesel pipe 350, the DEF pipe 360, or a combination thereof may extend.

Figure 5:
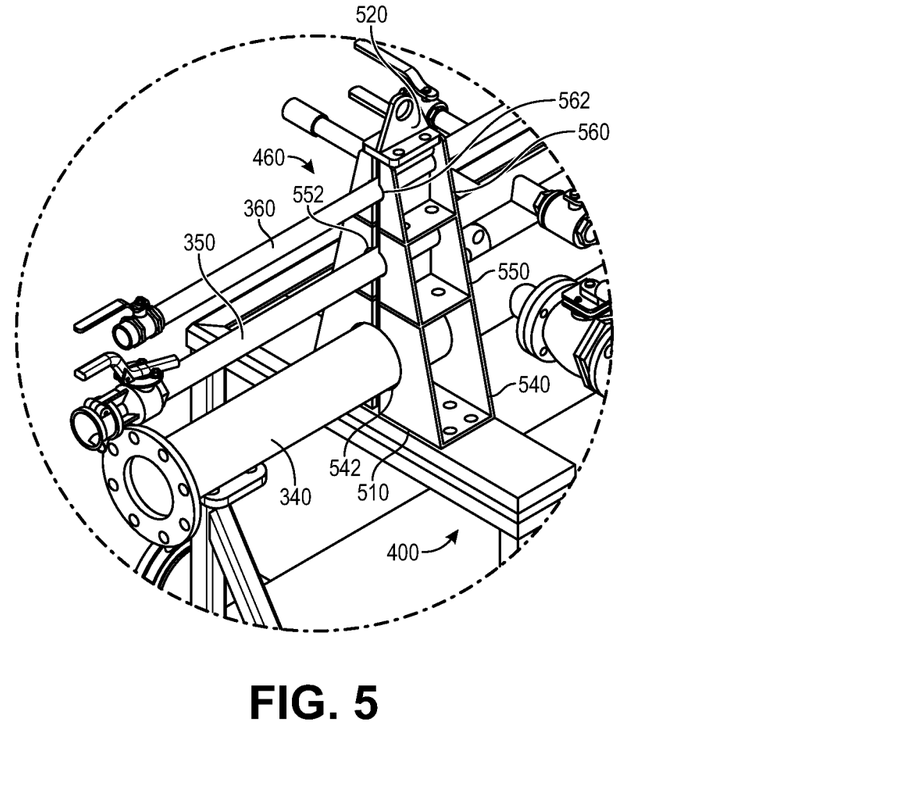
FIG. 5 illustrates an enlarged view of a portion of FIG. 4, according to an embodiment.

FIG. 5 illustrates an enlarged view of a portion of FIG. 4, according to an embodiment. The modular pipe mount 460 may include a bottom 510 and a top 520. The modular pipe mount 460 may be in the shape of a pyramid with the cross-sectional width decreasing from the bottom 510 to the top 520. This may minimize the size of the modular pipe mount 460 while still allowing it to receive and support the natural gas pipe 340, the diesel pipe 350, and the DEF pipe 360, which are stacked vertically with the diameters thereof decreasing from the largest (e.g., natural gas pipe 340) to the smallest (e.g., DEF pipe 360) proceeding in an upward direction.

The modular pipe mount 460 may include a first (e.g., lower) pipe mount 540 that may be coupled to the upper crossbeam 440 and extend upward therefrom. The lower pipe mount 540 may include an opening 542 that is configured to have the natural gas pipe 340 extend therethrough. The lower pipe mount 540 may also include two portions (e.g., halves) that may be assembled around the natural gas pipe 340 to facilitate installation.

The modular pipe mount 460 may also include a second (e.g., intermediate) pipe mount 550 that may be coupled to the lower pipe mount 540 and extend upward therefrom. As mentioned above, the intermediate pipe mount 550 may have a lesser width than the lower pipe mount 540. The intermediate pipe mount 550 may include an opening 552 that is configured to have the diesel pipe 350 extend therethrough. The intermediate pipe mount 550 may also include two portions (e.g., halves) that may be assembled around the diesel pipe 350 to facilitate installation.

The modular pipe mount 460 may also include a third (e.g., upper) pipe mount 560 that may be coupled to the intermediate pipe mount 550 and extend upward therefrom. As mentioned above, the upper pipe mount 560 may have a lesser width than the intermediate pipe mount 550. The upper pipe mount 560 may include an opening 562 that is configured to have the DEF pipe 360 extend therethrough.

The upper pipe mount 560 may also include two portions (e.g., halves) that may be assembled around the DEF pipe 360 to facilitate installation.

Depending upon the pipes (e.g., pipes 340, 350, 360) that are present at the wellsite 100, one or more of the pipe mounts 540, 550, 560 may be present in (or omitted from) the modular pipe mount 460, which provides the modularity.

Figure 6:
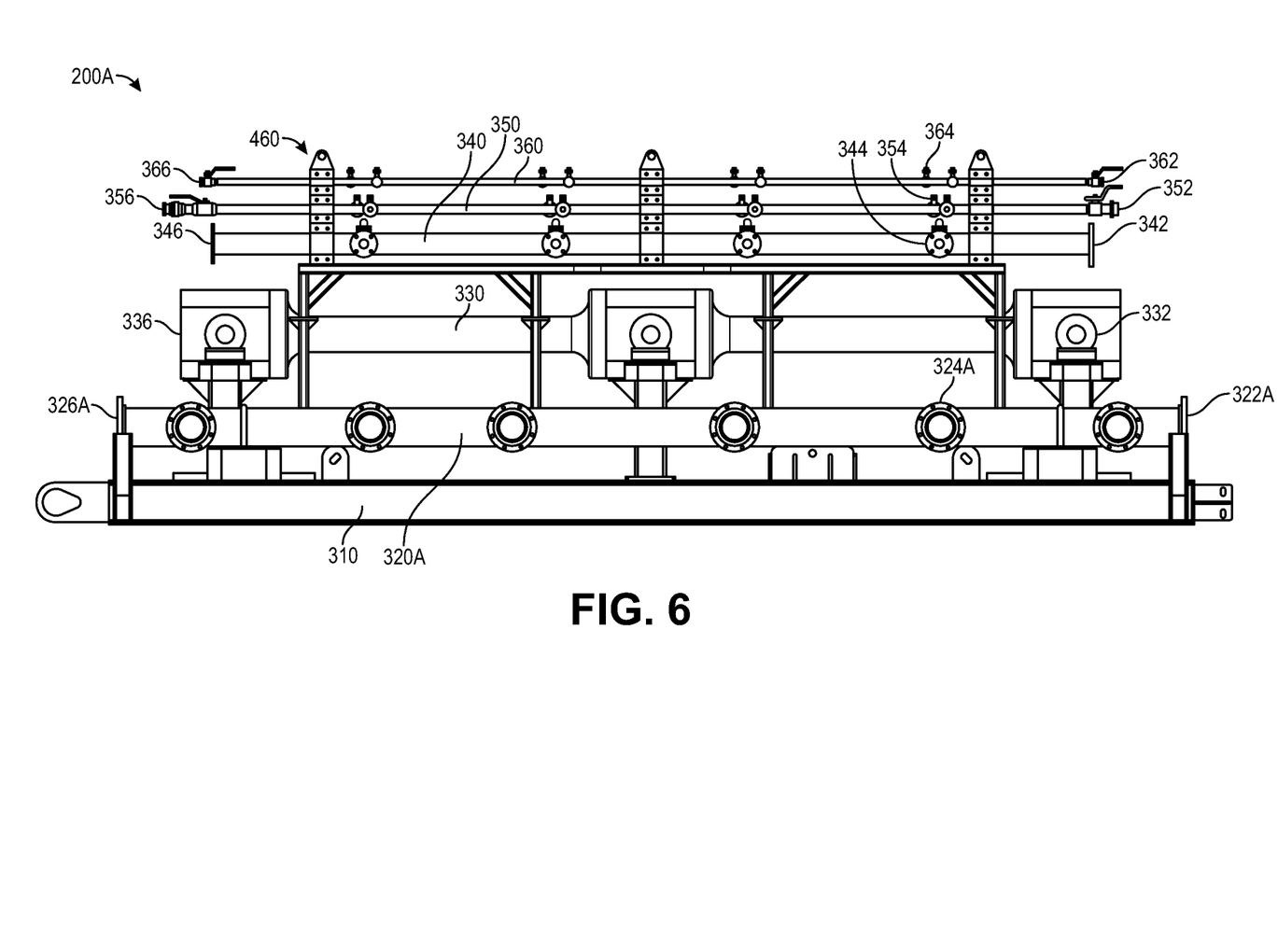
FIG. 6 illustrates a side view of the fluid distribution unit (from FIG. 3), according to an embodiment.

FIG. 6 illustrates a side view of the fluid distribution unit 200A, according to an embodiment. As mentioned above, in the example shown, the pipes may proceed vertically-upward in the following order: upstream frac pipe 320A, downstream frac pipe 330, natural gas pipe 340, diesel pipe 350, and DEF pipe 360.

In addition, a length of the support structure 400 may be less than length(s) of the upstream frac pipe 320A, the downstream frac pipe 330, the natural gas pipe 340, the diesel pipe 350, and the DEF pipe 360. Thus, axial ends of the upstream frac pipe 320A, the downstream frac pipe 330, the natural gas pipe 340, the diesel pipe 350, and the DEF pipe 360 may extend axially-beyond corresponding axial ends of the support structure 400. As a result, the support structure 400 may not obstruct or interfere with connections to the upstream frac pipe 320A, the downstream frac pipe 330, the natural gas pipe 340, the diesel pipe 350, and the DEF pipe 360.

Figure 7:
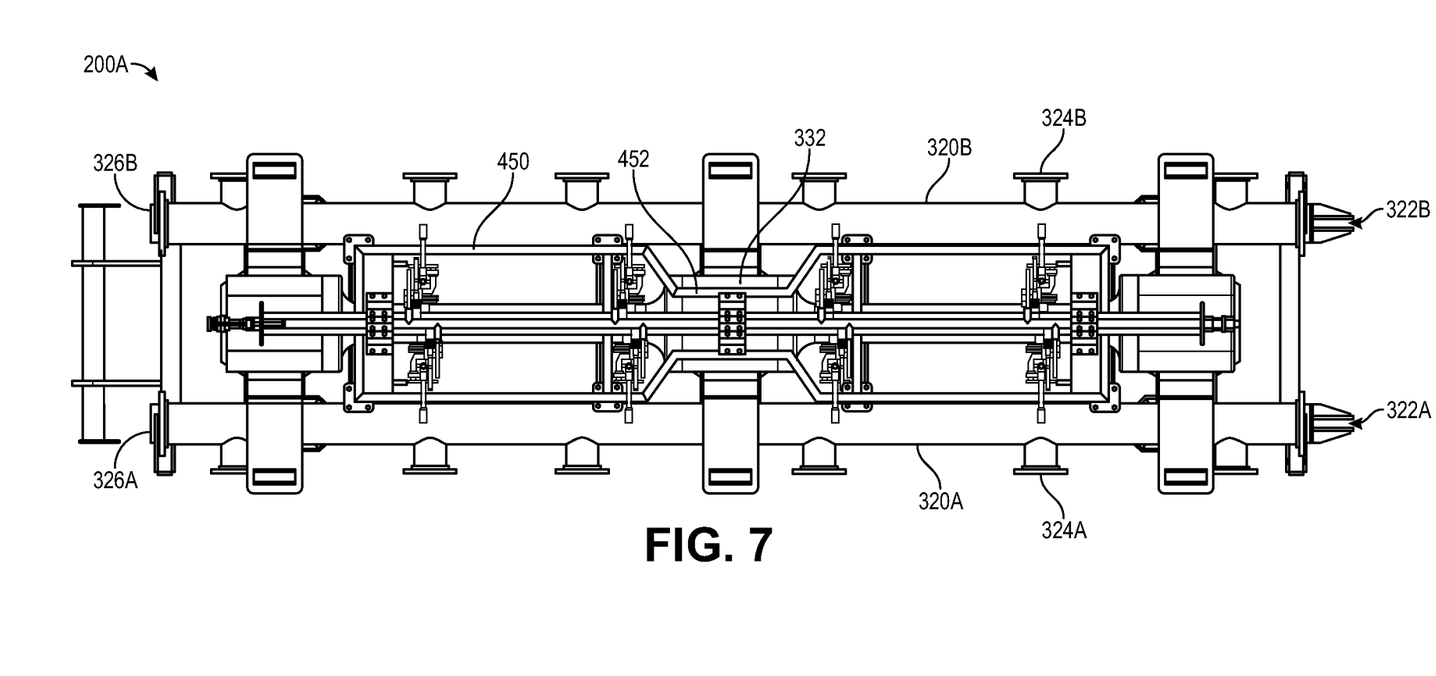
FIG. 7 illustrates a top view of the fluid distribution unit (from FIG. 3), according to an embodiment.

FIG. 7 illustrates a top view of the fluid distribution unit 200A, according to an embodiment. The downstream frac pipe 330, the natural gas pipe 340, the diesel pipe 350, the DEF pipe 360, the support structure 400, or a combination thereof may be positioned at least partially laterally-between the upstream frac pipes 320A, 320B. This may allow the base 310 and/or the upstream frac pipes 320A, 320B to shield/protect the downstream frac pipe 330, the natural gas pipe 340, the diesel pipe 350, the DEF pipe 360, the support structure 400, or a combination thereof during transit and/or installation.

In addition, at least a portion 452 of the axial beams 450 may bend inwards (e.g., the distance therebetween may be reduced). This may occur proximate to one or more of the inlets 332 of the downstream frac pipe 330. These portions 452 may be positioned laterally-inward from the inlets 332 so as to not interfere with the connections therewith.

As may be seen in FIGS. 1-7, having the natural gas pipe 340, the diesel pipe 350, the DEF pipe 360, the support structure 400, or a combination thereof positioned at least partially laterally-between the upstream frac pipes 320A, 320B may reduce the footprint of these components at the wellsite 100. In addition, having the natural gas pipe 340, the diesel pipe 350, the DEF pipe 360, the support structure 400, or a combination thereof positioned at least partially above the upstream frac pipes 320A, 320B, the downstream frac pipe 330, or a combination thereof may also reduce the footprint of these components at the wellsite 100.

Figure 8:
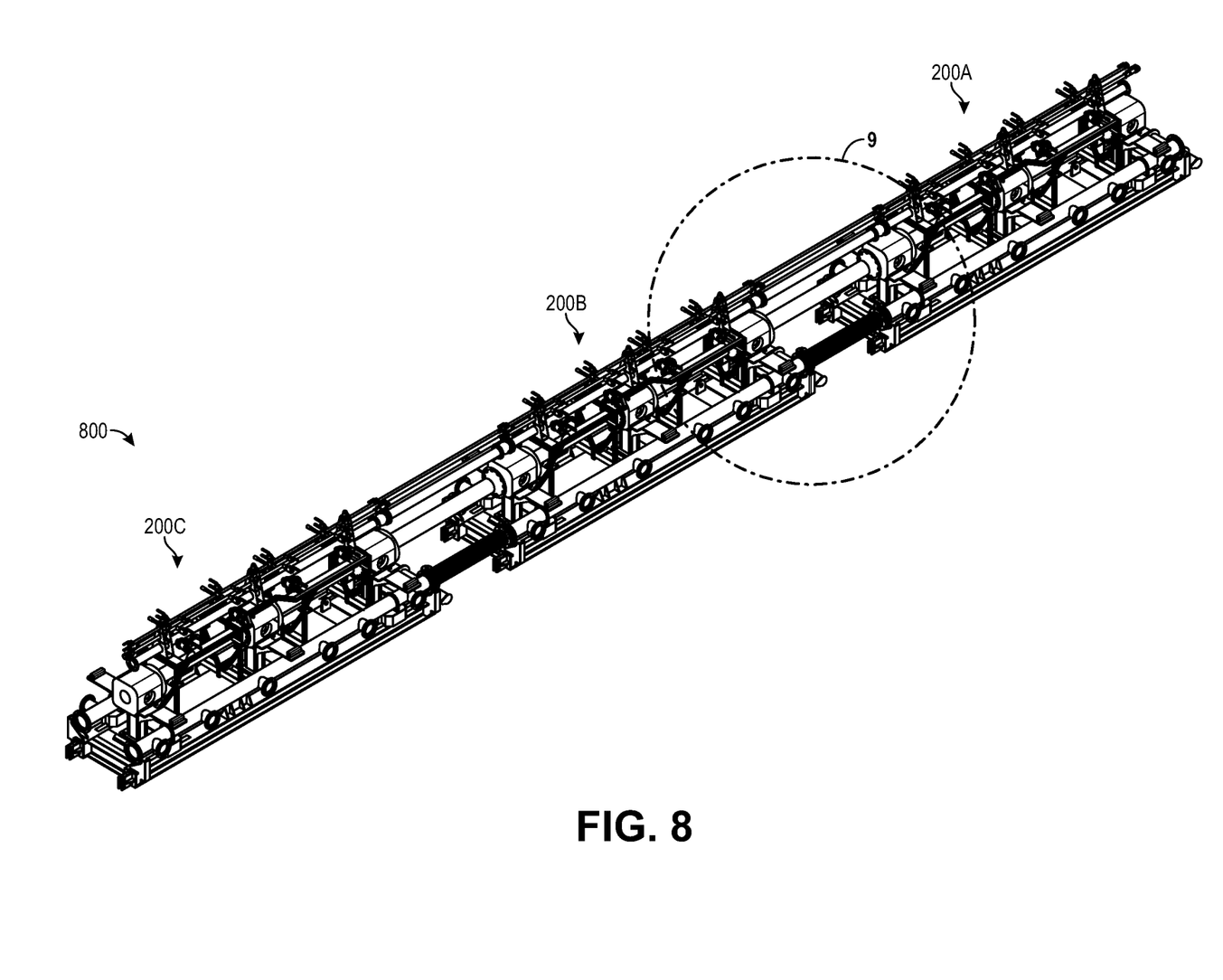
FIG. 8 illustrates a perspective view of a fluid distribution system including a plurality of fluid distribution units connected together in series, according to an embodiment.

FIG. 8 illustrates a perspective view of a fluid distribution system 800 including a plurality of fluid distribution units 200A-200C connected together in series, according to an embodiment. Connecting the fluid distribution units 200A-200C in series may provide more inlets and outlets, which may increase the number of pump units 134 that may be used at the wellsite 100.

Figure 9:
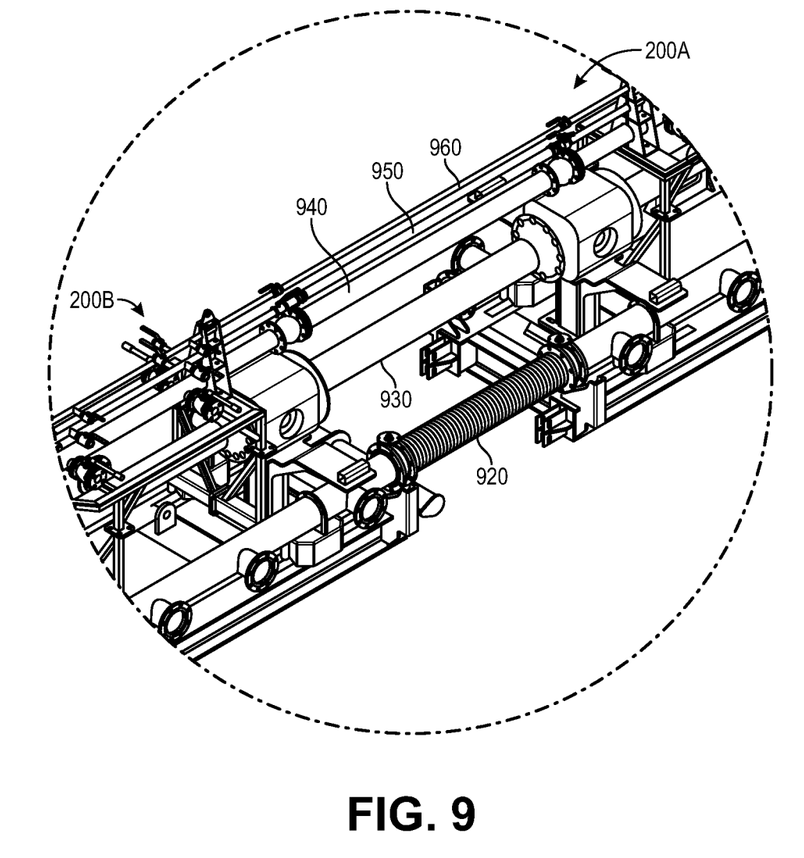
FIG. 9 illustrates an enlarged view of a portion of FIG. 8, according to an embodiment.

FIG. 9 illustrates an enlarged view of a portion of FIG. 8, according to an embodiment. The fluid distribution units 200A-200C may be spaced axially-apart (i.e., there may be an axial gap therebetween) when connected in series. To facilitate the connections, one or more axial connectors may be used. More particularly, one or more downstream axial frac connectors 920 may be connected to and positioned between the outlets 326A, 326B of the downstream frac pipes 320A, 320B of the fluid distribution unit 200A and the corresponding inlets of the downstream frac pipes of the fluid distribution unit 200B. An upstream axial frac connector 930 may be connected to and positioned between the outlet 336 of the upstream frac pipe 330 of the fluid distribution unit 200A and the corresponding inlet of the upstream frac pipe of the fluid distribution 200B. A natural gas axial connector 940 may be connected to and positioned between the outlet 346 of the natural gas pipe 340 of the fluid distribution unit 200A and the corresponding inlet of the natural gas pipe of the fluid distribution unit 200B. A diesel axial connector 950 may be connected to and positioned between the outlet 356 of the diesel pipe 350 of the fluid distribution unit 200A and the corresponding inlet of the diesel pipe of the fluid distribution 200B. A DEF axial connector 960 may be connected to and positioned between the outlet 366 of the diesel pipe 360 of the fluid distribution unit 200A and the corresponding inlet of the diesel pipe of the fluid distribution 200B.

Figure 10:
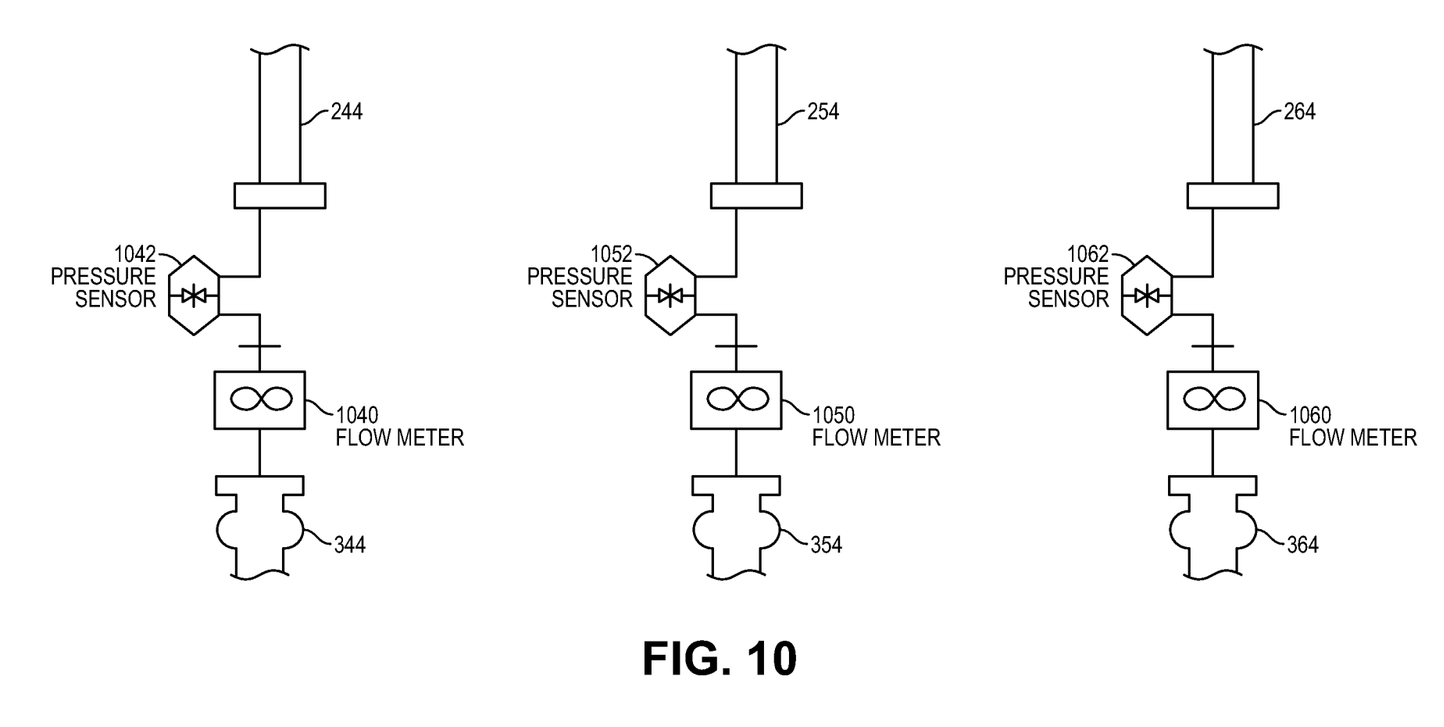
FIG. 10 illustrates a schematic view of flow meters and pressure sensors positioned between the hoses and the outlets of the pipes, according to an embodiment.

FIG. 10 illustrates a schematic view of flow meters 1040, 1050, 1060 and pressure sensors 1042, 1052, 1062 positioned between the hoses 244, 254, 264 and the outlets 344, 354, 364 of the pipes 340, 350, 360, according to an embodiment. A natural gas flow meter 1040 may be connected to and/or positioned between the outlet 344 of the natural gas pipe 340 and the natural gas hose 244. A diesel flow meter 1050 may be connected to and/or positioned between the outlet 354 of the diesel pipe 350 and the diesel hose 254. A DEF flow meter 1060 may be connected to and/or positioned between the outlet 364 of the DEF pipe 360 and the DEF hose 264. The flow meters 1040, 1050, 1060 may be configured to measure the flow rates of the natural gas, diesel, and DEF. These flow rates may be transmitted to the control unit 270.

A natural gas pressure sensor 1042 may be connected to and/or positioned between the outlet 344 of the natural gas pipe 340 and the natural gas hose 244. As shown, the natural gas flow meter 1040 and the natural gas pressure sensor 1042 may be connected in series. A diesel pressure sensor 1052 may be connected to and/or positioned between the outlet 354 of the diesel pipe 350 and the diesel hose 254. As shown, the diesel flow meter 1050 and the diesel pressure sensor 1052 may be connected in series. A DEF pressure sensor 1062 may be connected to and/or positioned between the outlet 364 of the DEF pipe 360 and the DEF hose 264. As shown, the DEF flow meter 1060 and the DEF pressure sensor 1062 may be connected in series. The pressure sensors 1042, 1052, 1062 may be configured to measure the pressures of the natural gas, diesel, and DEF. These pressures may be transmitted to the control unit 270.

Figure 11:
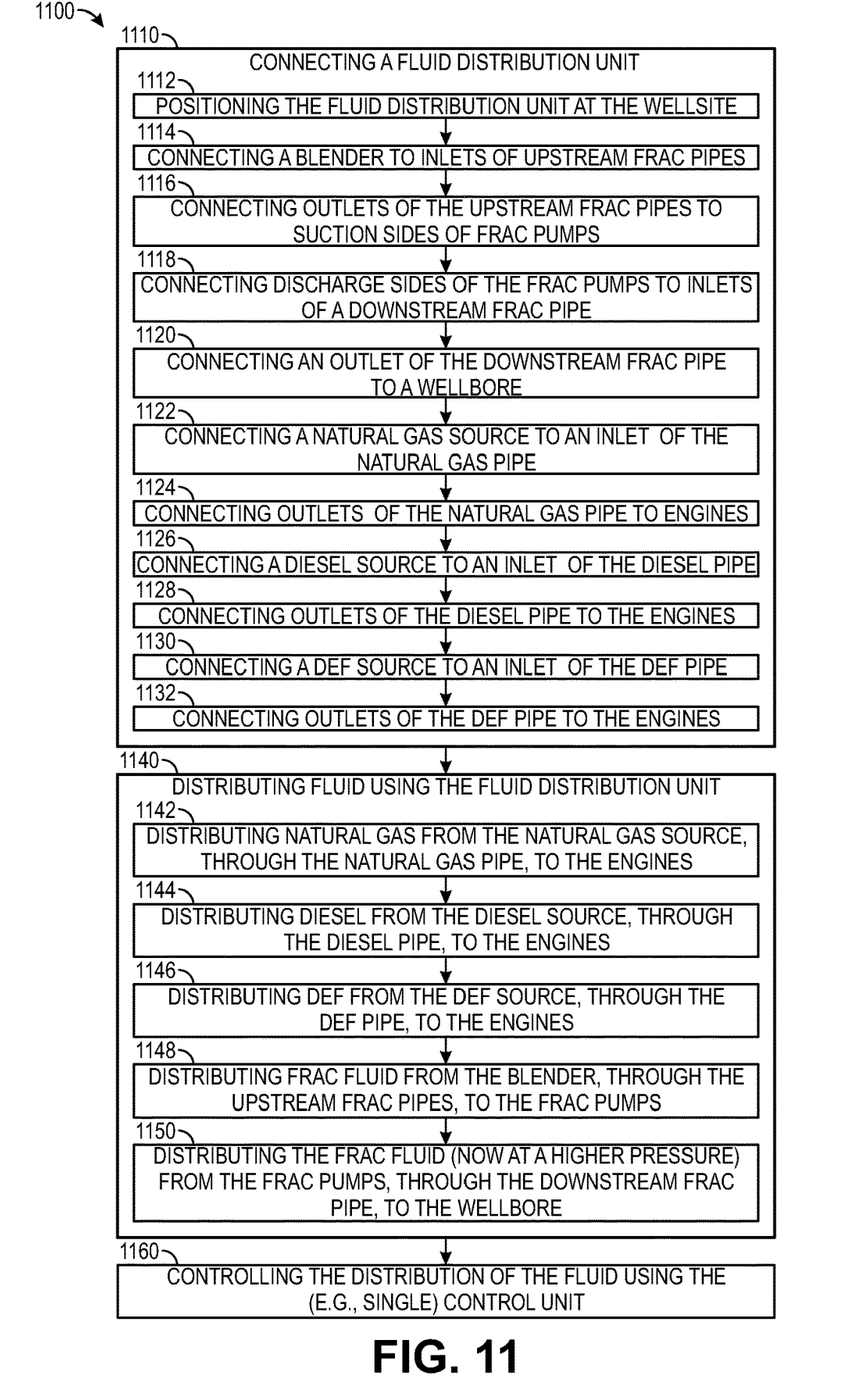
FIG. 11 illustrates a flowchart of a method for distributing fluid at the wellsite, according to an embodiment.

FIG. 11 illustrates a flowchart of a method 1100 for distributing fluid at the wellsite 100, according to an embodiment. An illustrative order of the method 1100 is provided below; however, one or more steps of the method 1100 may be performed in a different order, combined, split into sub-steps, repeated, or omitted without departing from the scope of the disclosure.

The method 1100 may include connecting the fluid distribution unit(s) 200A-200C, as at 1110. Connecting the fluid distribution unit(s) 200A-200C may include positioning the fluid distribution unit(s) 200A-200C at the wellsite 100, as at 1112. The fluid distribution unit(s) 200A-200C may be positioned by the lifting device, which may be connected to the connectors 372 on the arms 370. The fluid distribution unit(s) 200A-200C may be positioned at least partially between the groups 136A, 136B of pump units 134 to minimize the distance therebetween, thus minimizing the aggregate lengths of the hoses. When more than one fluid distribution unit 200A-200C is used, they may be positioned in series with axial gaps therebetween. When more than one fluid distribution unit 200A-200C is used, they may be connected together using the connectors 920A, 920B, 930, 940, 950, 960.

Connecting the fluid distribution unit(s) 200A-200C may also include connecting the blender 126 to the inlets 322A, 322B of the upstream frac pipes 320A, 320B, as at 1114. Connecting the fluid distribution unit(s) 200A-200C may also include connecting the outlets 324A, 324B of the upstream frac pipes 320A, 320B to the suction sides of the frac pumps 130, as at 1116. When more than one fluid distribution unit 200A-200C is used, the (second) outlets 326A, 326B may be connected to corresponding inlets of upstream frac pipes of a downstream fluid distribution unit 200B, 200C.

Connecting the fluid distribution unit(s) 200A-200C may also include connecting the discharge sides of the frac pumps 130 to the inlets 332 of the downstream frac pipe 330, as at 1118. Connecting the fluid distribution unit(s) 200A-200C may also include connecting the outlet 334 of the downstream frac pipe 330 to the wellbore 110 (e.g., via the wellhead 112), as at 1120. When more than one fluid distribution unit 200A-200C is used, the outlet 334 of the downstream frac pipe 330 of the fluid distribution unit 200A may be connected to a corresponding inlet of the downstream frac pipe of a downstream fluid distribution unit 200B, 200C.

Connecting the fluid distribution unit(s) 200A-200C may also include connecting the natural gas source 140 to the inlet 342 of the natural gas pipe 340, as at 1122. Connecting the fluid distribution unit(s) 200A-200C may also include connecting the outlets 344 of the natural gas pipe 340 to the engines 132 (via the natural gas hoses 244), as at 1124.

Connecting the fluid distribution unit(s) 200A-200C may also include connecting the diesel source 150 to the inlet 352 of the diesel pipe 350, as at 1126. Connecting the fluid distribution unit(s) 200A-200C may also include connecting the outlets 354 of the diesel pipe 350 to the engines 132 (via the diesel hoses 254), as at 1128.

Connecting the fluid distribution unit(s) 200A-200C may also include connecting the DEF source 160 to the inlet 362 of the DEF pipe 360, as at 1130. Connecting the fluid distribution unit(s) 200A-200C may also include connecting the outlets 364 of the DEF pipe 350 to the engines 132 (via the DEF hoses 264), as at 1132.

The method 1100 may also include distributing fluid using the fluid distribution unit(s) 200A-200C, as at 1140. Distributing fluid may include distributing the natural gas from the natural gas source 140, through the natural gas pipe 340, to the engines 132, as at 1142. Distributing fluid may also include distributing the diesel from the diesel source 150, through the diesel pipe 350, to the engines 132, as at 1144. As mentioned above, the engines 132 may be or include dual-fuel engines that run off natural gas, diesel, or both. The engines 132 may power the frac pumps 130. Distributing fluid may also include distributing the DEF from the DEF source 160, through the DEF pipe 360, to the engines 132, as at 1146.

Distributing fluid may also include distributing the frac fluid from the blender 126, through the upstream frac pipes 320A, 320B, to the frac pumps 130, as at 1148. As mentioned above, the frac pumps 130 may increase the pressure of the frac fluid. Distributing fluid may also include distributing the frac fluid (now at a higher pressure) from the frac pumps 130, through the downstream frac pipe 330, to the wellbore 110 (e.g., via the wellhead 112), as at 1150.

The method 1100 may also include controlling the distribution of the fluid using the (e.g., single) control unit 270, as at 1160.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

What is claimed is:

1. A fluid distribution unit, comprising:
   a first upstream frac pipe configured to receive a frac fluid and to distribute the frac fluid to a plurality of pump units at a first pressure;
   a downstream frac pipe configured to receive the frac fluid from the pump units at a second pressure that is greater than the first pressure, wherein the frac fluid at the second pressure is directed into a wellbore;
   a natural gas pipe configured to receive natural gas from a gas source and to distribute the natural gas to the pump units; and
   a diesel pipe configured to receive diesel from a diesel source and to distribute the diesel to the pump units,
   wherein the natural gas pipe, the diesel pipe, or both are positioned at least partially above the first upstream frac pipe, the downstream frac pipe, or both, and
   wherein the natural gas pipe is positioned above the downstream frac pipe, and wherein the natural gas pipe comprises:
     a natural gas inlet configured to be connected to the natural gas source and to receive the natural gas from the natural gas source; and
     a plurality of natural gas outlets that are axially-spaced apart from one another and configured to be connected to a plurality of engines of the pump units.

2. The fluid distribution unit of claim 1, further comprising a second upstream frac pipe, wherein the first and second upstream frac pipes are spaced laterally-apart from one another, and wherein the downstream frac pipe, the natural gas pipe, and the diesel pipe are positioned at least partially within a footprint defined by the first and second upstream frac pipes.

3. The fluid distribution unit of claim 2, wherein the downstream frac pipe, the natural gas pipe, and the diesel pipe are positioned above and laterally-between the first and second upstream frac pipes.

4. A fluid distribution unit, comprising:
a first upstream frac pipe configured to receive a frac fluid and to distribute the frac fluid to a plurality of pump units at a first pressure;
a downstream frac pipe configured to receive the frac fluid from the pump units at a second pressure that is greater than the first pressure, wherein the frac fluid at the second pressure is directed into a wellbore;
a natural gas pipe configured to receive natural gas from a gas source and to distribute the natural gas to the pump units; and
a diesel pipe configured to receive diesel from a diesel source and to distribute the diesel to the pump units, wherein the natural gas pipe, the diesel pipe, or both are positioned at least partially above the first upstream frac pipe, the downstream frac pipe, or both, and wherein the diesel pipe is positioned above the natural gas pipe, and
wherein the diesel pipe comprises:
a diesel inlet configured to be connected to the diesel source and to receive the diesel from the diesel source; and
a plurality of diesel outlets that are axially-spaced apart from one another and configured to be connected to a plurality of engines of the pump units.

5. A fluid distribution unit, comprising:
a first upstream frac pipe configured to receive a frac fluid and to distribute the frac fluid to a plurality of pump units at a first pressure,
a downstream frac pipe configured to receive the frac fluid from the pump units at a second pressure that is greater than the first pressure, wherein the frac fluid at the second pressure is directed into a wellbore;
a natural gas pipe configured to receive natural gas from a gas source and to distribute the natural gas to the pump units;
a diesel pipe configured to receive diesel from a diesel source and to distribute the diesel to the pump units; and
a diesel exhaust fluid (DEF) pipe configured to receive DEF from a DEF source and to distribute the DEF to the pump units,
wherein the natural gas pipe, the diesel pipe, or both are positioned at least partially above the first upstream frac pipe, the downstream frac pipe, or both.

6. The fluid distribution unit of claim 5, wherein the DEF pipe is positioned above the first upstream frac pipe, the downstream frac pipe, or both, and wherein the DEF pipe comprises:
a DEF inlet configured to be connected to the DEF source and to receive the DEF from the DEF source; and
a plurality of DEF outlets that are axially-spaced apart from one another and configured to be connected to a plurality of engines of the pump units.

7. A fluid distribution unit, comprising:
a first upstream frac pipe configured to receive a frac fluid and to distribute the frac fluid to a plurality of pump units at a first pressure;
a downstream frac pipe configured to receive the frac fluid from the pump units at a second pressure that is greater than the first pressure, wherein the frac fluid at the second pressure is directed into a wellbore;
a natural gas pipe configured to receive natural gas from a gas source and to distribute the natural gas to the pump units;
a diesel pipe configured to receive diesel from a diesel source and to distribute the diesel to the pump units; and
a support structure including:
a first pipe mount configured to have the natural gas pipe extend therethrough; and
a second pipe mount configured to have the diesel pipe extend therethrough, wherein the first and second pipe mounts are positioned above the first upstream frac pipe and the downstream frac pipe.

8. The fluid distribution unit of claim 7, wherein the second pipe mount is configured to be disconnected from the first pipe mount.

9. The fluid distribution unit of claim 7, wherein axial ends of the support structure are positioned axially-between:
axial ends of the first upstream frac pipe;
axial ends of the downstream frac pipe;
axial ends of the natural gas pipe; and
axial ends of the diesel pipe.

10. A fluid distribution unit, comprising:
a base;
a first upstream frac pipe positioned above the base;
a second upstream frac pipe positioned above the base, wherein the first and second upstream frac pipes are spaced laterally-apart from one another, and wherein the first and second upstream frac pipes each comprise:
an upstream frac pipe inlet configured to be connected to a frac fluid source and to receive a frac fluid at a first pressure from the frac fluid source; and
a plurality of upstream frac pipe outlets configured to be connected to a plurality of frac pumps, wherein the frac fluid at the first pressure flows out of the upstream frac pipe outlets to the frac pumps;
a downstream frac pipe positioned above the first and second upstream frac pipes, wherein the downstream frac pipe comprises:
a plurality of downstream frac pipe inlets configured to be connected to the frac pumps and to receive the frac fluid at a second pressure from the frac pumps, wherein the second pressure is greater than the first pressure; and
a downstream frac pipe outlet configured to be connected to a wellhead, wherein the frac fluid at the second pressure flows out of the downstream frac pipe outlet to the wellhead;
a natural gas pipe positioned above the downstream frac pipe, wherein the natural gas pipe comprises:
a natural gas inlet configured to be connected to a natural gas source and to receive natural gas from the natural gas source; and
a plurality of natural gas outlets configured to be connected to a plurality of engines, wherein the natural gas flows out of the natural gas outlets to the engines;
a diesel pipe positioned above the downstream frac pipe, wherein the diesel pipe comprises:

a diesel inlet configured to be connected to a diesel source and to receive diesel from the diesel source; and a plurality of diesel outlets configured to be connected to the engines, wherein the diesel flows out of the diesel outlets to the engines, wherein the engines comprise dual-fuel engines, and wherein the engines are configured to drive the frac pumps; and a diesel exhaust fluid (DEF) pipe positioned above the downstream frac pipe, wherein the DEF pipe comprises:

a DEF inlet configured to be connected to a DEF source and to receive DEF from the DEF source; and a plurality of DEF outlets configured to be connected to the engines, wherein the DEF flows out of the DEF outlets to the engines.

11. The fluid distribution unit of claim 10, wherein:
the downstream frac pipe is positioned at least partially laterally-between the first and second upstream frac pipes;
the natural gas pipe is positioned at least partially laterally-between the first and second upstream frac pipes;
the diesel pipe is positioned above the natural gas pipe and at least partially laterally-between the first and second upstream frac pipes; and
the DEF pipe is positioned above the diesel pipe and at least partially laterally-between the first and second upstream frac pipes.

12. The fluid distribution unit of claim 10, further comprising a support structure including:
a first pipe mount configured to have the natural gas pipe extend therethrough;
a second pipe mount configured to have the diesel pipe extend therethrough, wherein a width of the second pipe mount is less than a width of the first pipe mount; and
a third pipe mount configured to have the DEF pipe extend therethrough, wherein a width of the third pipe mount is less than a width of the second pipe mount.

13. The fluid distribution unit of claim 10, further comprising a support structure configured to support the natural gas pipe, the diesel pipe, and the DEF pipe, wherein the support structure comprises first and second axial beams, wherein the first and second axial beams each comprise first and second portions, wherein the first portions, the second portions, or both are substantially parallel to the first and second upstream frac pipes, the downstream frac pipe, the natural gas pipe, the diesel pipe, and the DEF pipe, and wherein a distance between the first portions is greater than a distance between the second portions.

14. The fluid distribution unit of claim 13, wherein the first portions are positioned laterally-outward from the downstream frac pipe inlets, and wherein the second portions are positioned laterally-inward from the downstream frac pipe inlets, so as to not interfere with connections to the downstream frac pipe inlets.

15. A method for distributing fluid at a wellsite, the method comprising:
distributing natural gas from a natural gas source, through a natural gas pipe, to a plurality of pump units;
distributing diesel from a diesel source, through a diesel pipe, to the pump units;
distributing frac fluid from a frac fluid source, through first and second upstream frac pipes, to the pump units; and
distributing the frac fluid from the frac pumps, through a downstream frac pipe, and into a wellbore,
wherein the natural gas pipe, the diesel pipe, or both are positioned at least partially laterally-between the first and second upstream frac pipes, and
wherein the downstream frac pipe is positioned above the first and second upstream frac pipes, and wherein the natural gas pipe and the diesel pipe are positioned above the downstream frac pipe.

16. The method of claim 15, wherein the natural gas pipe, the diesel pipe, the first and second upstream frac pipes, and the downstream frac pipe are part of a fluid distribution unit, and further comprising:
positioning the fluid distribution unit at a wellsite;
connecting a plurality of natural gas hoses to the natural gas pipe and the pump units; and
connecting a plurality of diesel hoses to the diesel source and the pump units,
wherein the fluid distribution unit is positioned to minimize an aggregate length of the natural gas hoses, the diesel hoses, or a combination thereof.

17. The method of claim 15, wherein the natural gas pipe, the diesel pipe, the first and second upstream frac pipes, and the downstream frac pipe are part of a first fluid distribution unit, and further comprising:
positioning the first fluid distribution unit at a wellsite;
positioning a second fluid distribution unit at the wellsite such that the first and second fluid distribution units are axially aligned with one another, and an axial gap is present therebetween; and
connecting the first and second fluid distribution units together using one or more connectors that bridge the axial gap.

18. The method of claim 15, further comprising controlling distribution of the natural gas, the diesel, and the frac fluid using a single control unit.

* * * * *